United States Patent
Sampei et al.

[11] Patent Number: 5,933,235
[45] Date of Patent: Aug. 3, 1999

[54] OPTICAL SPECTRUM ANALYZER AND SPECTROMETER

[75] Inventors: Yoshihiro Sampei; Yasuyuki Suzuki; Yoshihiko Tachikawa; Mamoru Arihara, all of Tokyo, Japan

[73] Assignee: Yokogawa Electric Corporation, Tokyo, Japan

[21] Appl. No.: 08/836,505

[22] PCT Filed: Mar. 12, 1996

[86] PCT No.: PCT/JP96/00612

§ 371 Date: May 7, 1997

§ 102(e) Date: May 7, 1997

[87] PCT Pub. No.: WO96/28713

PCT Pub. Date: Sep. 19, 1996

[30] Foreign Application Priority Data

Mar. 15, 1995 [JP] Japan ................... 7-055334
Feb. 7, 1996 [JP] Japan ................... 8/020914

[51] Int. Cl.$^6$ ................... G01J 3/28
[52] U.S. Cl. ................... 356/326; 356/328
[58] Field of Search ................... 356/326, 328, 356/330–334, 418

[56] References Cited

U.S. PATENT DOCUMENTS

| | | |
|---|---|---|
| 4,158,505 | 6/1979 | Mathisen et al. . |
| 4,375,919 | 3/1983 | Busch . |
| 4,983,039 | 1/1991 | Harada et al. . |
| 5,357,343 | 10/1994 | Lowne et al. ................... 356/418 |

FOREIGN PATENT DOCUMENTS

| | | |
|---|---|---|
| 59-135331 | 8/1984 | Japan . |
| 60-117118 | 6/1985 | Japan . |
| 63-47622 | 2/1988 | Japan . |
| 1-321325 | 12/1989 | Japan . |
| 2-61528 | 3/1990 | Japan . |

OTHER PUBLICATIONS

Izumi et al "Wavelength . . . Pollutants" J. Phys. E. Sci. Instrument vol. 4, No. 1, Jan. 1981

*Primary Examiner*—K P Hantis
*Attorney, Agent, or Firm*—Moonray Kojima

[57] ABSTRACT

A first invention of the present application is an optical spectrum analyzer comprising a spectrometer apparatus an arithmetic unit for calculating the center wavelength from output signals from photo detector devices of a device array included in the spectrometer apparatus and from the light power distribution at an incident port by interpolation and for calculating the total power, and a display unit for displaying values of the center wavelength and total power. The dispersing device directs light introduced from the incident port at the dispersing device. Light going out of the dispersing device is focused onto the device array. In this structure, the outputs (theoretical values) from the photo detector devices are calculated. Where the n-th device of the device array producing a maximum output deviates from the center of the outgoing beam impinging on the device array by an amount of $\Delta x$, the relation between the deviation $\Delta x$ and the associated photo detector device is found in advance. If values are obtained by actual measurements, $\Delta x$ is found from the above relation. Then, the center wavelength is found. Also, the total power can be calculated from the theoretical values of the outputs from the photo detector devices and from the values obtained by actual measurements.

9 Claims, 9 Drawing Sheets

(a) ω=30μm (b) ω=50μm (c) ω=70μm

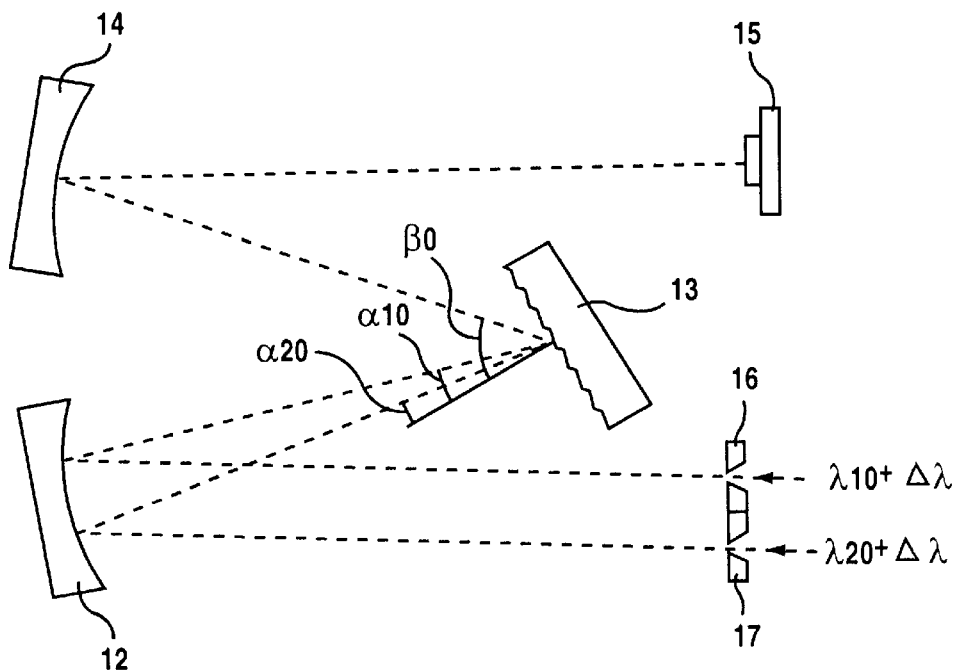
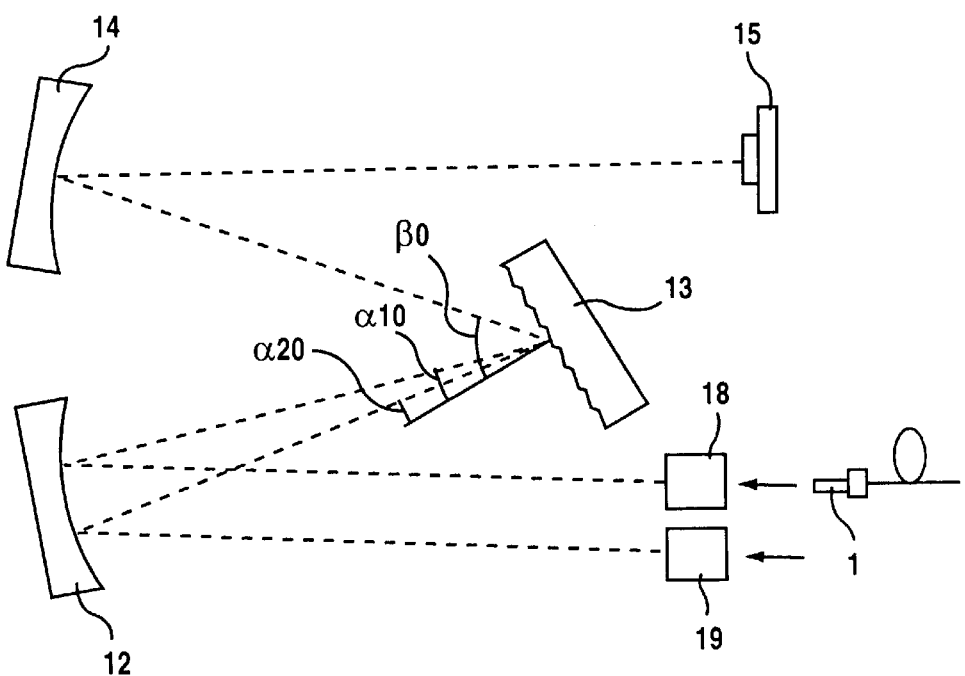

5,933,235

OPTICAL SPECTRUM ANALYZER AND SPECTROMETER

TECHNICAL FIELD

The present invention relates to an optical spectrum analyzer and to a spectrometer apparatus using a detector array and, more particularly, to improvements in the wavelength accuracy of an optical spectrum analyzer and improvements in the power level accuracy, as well as improvements for extension of the range of measured wavelengths.

BACKGROUND ART

The prior art optical spectrum analyzer indicates the average value of light power existing within a finite slit width, or a finite spectral width.

A spectrograph using a detector array has been urged to display the output from each device as it is, for the following reason. The spectrum of light under measurement is assumed to have an arbitrary shape. The spectral shape does not always have a 1:1 relation to the output from the device array.

Accordingly, it has been difficult to estimate the real spectral shape from the output from the device array.

Furthermore, the wavelength resolution and the range of measured wavelengths are determined by the number of the devices of the array, the pitch, the focal distance of the focusing mirror, and other factor. Trade-offs are made between the wavelength resolution and the range of measured wavelengths. Therefore, if one is improved, then the other is deteriorated. It is impossible to improve both at the same time.

In view of the foregoing, the present invention has been made. It is an object of the present invention to provide an optical spectrum analyzer which assumes that light under investigation is an assemblage of monochromatic light rays (light whose spectral linewidth is much narrower than the resolution of the instrument such as laser light) and which can find the center wavelength of the monochromatic light and the total power by performing simple arithmetic operations from the outputs from adjacent devices of a device array.

It is another object of the invention to realize an optical spectrum analyzer capable of measuring ASE noise buried in laser light and of equivalently improving the dynamic range.

It is a further object of the invention to realize a spectrometer apparatus which is applicable to an optical spectrum analyzer and which is provided with a plurality of incident ports, or slits, to extend the range of measured wavelengths while maintaining desired wavelength resolution.

DISCLOSURE OF THE INVENTION

The first-mentioned object is achieved in accordance with the teachings of the invention by an optical spectrum analyzer comprising a spectrometer apparatus, an arithmetic unit for calculating the center wavelength from output signals from light-receiving devices of a device array and from the light power distribution at an incident port by interpolation and for calculating the total power, and a display unit for displaying values of the center wavelength and total power. The spectrometer apparatus directs light introduced from an incident port at the light-dispersing device. Light going out of the light-dispersing device is focused onto the device array.

In this structure, the outputs (theoretical values) from the photo detector devices have been previously calculated. It is assumed that the n-th device of the device array produces a maximum output and deviates from the center of the outgoing beam impinging on the device array by an amount of $\Delta x$. The relation between the amount of deviation $\Delta x$ and the associated photo detector device is found in advance.

If values are obtained by actual measurements, the amount of deviation $\Delta x$ is found from the above relation. Then, the center wavelength is found. Also, the total power can be calculated from the theoretical values of the outputs from the photo detector devices and from the values obtained by actual measurements.

BRIEF DESCRIPTION OF THE DRAWINGS

FIG. 11 is a diagram of main portions of a spectrometer apparatus according to the invention; and FIGS. 12–16 are diagrams of other spectrometer apparatus' according to the invention.

BEST MODE FOR CARRYING OUT THE INVENTION

Figure 1:
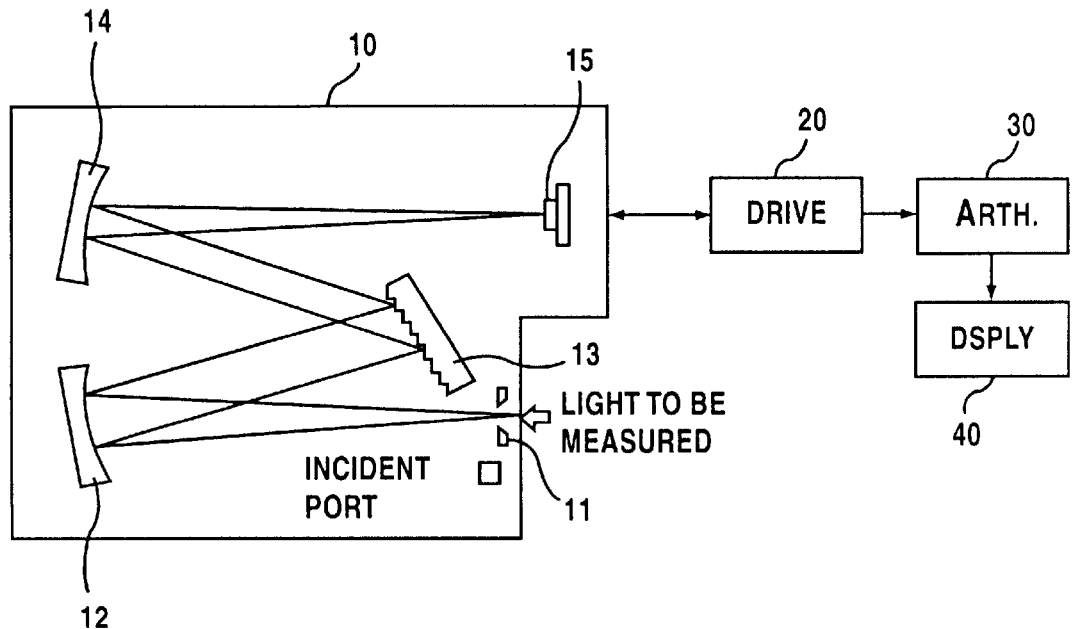
FIG. 1 is a diagram of main portions of an optical spectrum analyzer according to the invention.

The present invention is hereinafter described in detail with reference to the accompanying drawings. FIG. 1 is a diagram illustrating the principle of operation of an optical spectrum analyzer according to the present invention. In FIG. 1, a spectrometer apparatus 10 has a light-dispersing device and a device array. A driver 20 drives the device array of the spectrometer apparatus 10 and reads out signals. Also shown are an arithmetic unit 30 and a display unit 40.

The spectrometer apparatus 10 comprises a slit 11, a collimating mirror 12, a light-dispersing device 13 such as a diffraction grating, a focusing mirror 14, and a device array 15. Light to be measured enters via the incident port of the slit 11, and is collimated by the collimating mirror 12. Then, the light enters the light-dispersing device 13. Light going out of the light-dispersing device 13 is focused onto the device array 15 by the focusing mirror 14. In this case, the light-dispersing device 13 is fixed. The position of the light spot falling on the device array 15 moves or shifts according to the wavelength of the light to be measured.

The algorithm of calculations possessed by the arithmetic unit 30 is next described.

Figure 2:
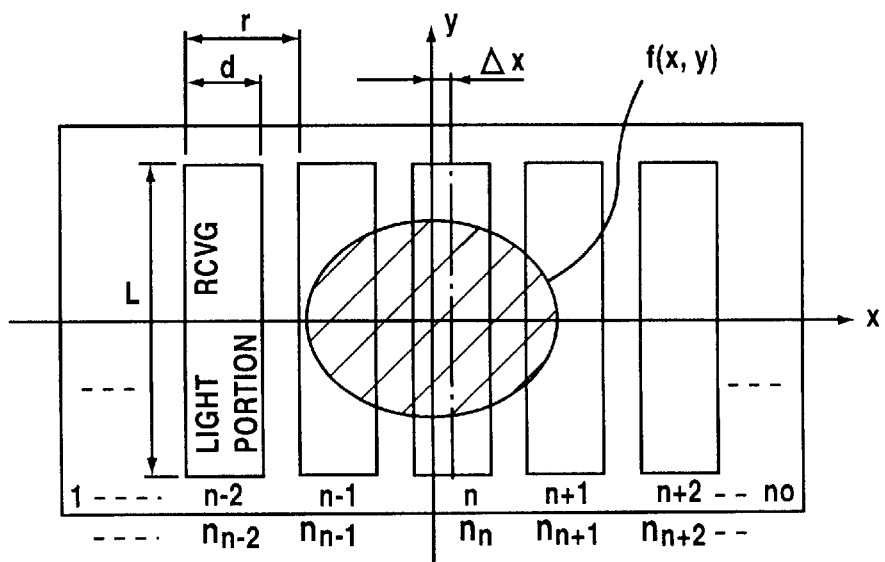
FIG. 2 is a diagram illustrating the relation between a device array and outgoing beam.

As shown in FIG. 2, the device array consists of an array of stripe-shaped photo detector elements (devices or light-receiving devices). Let $n_0$ be the number of the devices. Let L and d be the length and width, respectively, of each device. Let r be the pitch between the devices.

In this construction of the device array, the output from the n-th device assumes a maximum value. If the center of this n-th device is spaced $\Delta x$ from the center (x=0) of the outgoing beam (having an intensity distribution of f(x, y)), the following procedure is adopted in accordance with the present invention. First, $\Delta x$ is found from the outputs from the devices $P_{n-2}, P_{n-1}, P_n(\max), P_{n+1}, \ldots$ Then, wavelengths are calculated by interpolation. Thus, the total power is estimated. This procedure is adopted under the following conditions:

(1) The spectral linewidth of the light under measurement is sufficiently small. In this example, laser light is assumed. The spread or shape of the outgoing beam is mainly determined by diffraction caused by lenses or by the power distribution at the incident port.

(2) It is assumed that numbers given to the devices of the array have been previously correlated with wavelengths, and that spaces between devices of the array can be interpolated with $\Delta x$.

We further assume that wavelengths $\lambda_1, \ldots, \lambda_{n-1}, \lambda_n, \lambda_{n+1}, \ldots, \lambda_0$ correspond to device numbers $1, \ldots, n-1, n, n+1, \ldots, n_0$, respectively, and that the wavelength difference between devices is given by $$\lambda_k - \lambda_{k-1} \approx \Delta\lambda$$

where k=2 to $n_0$.

Figure 3:
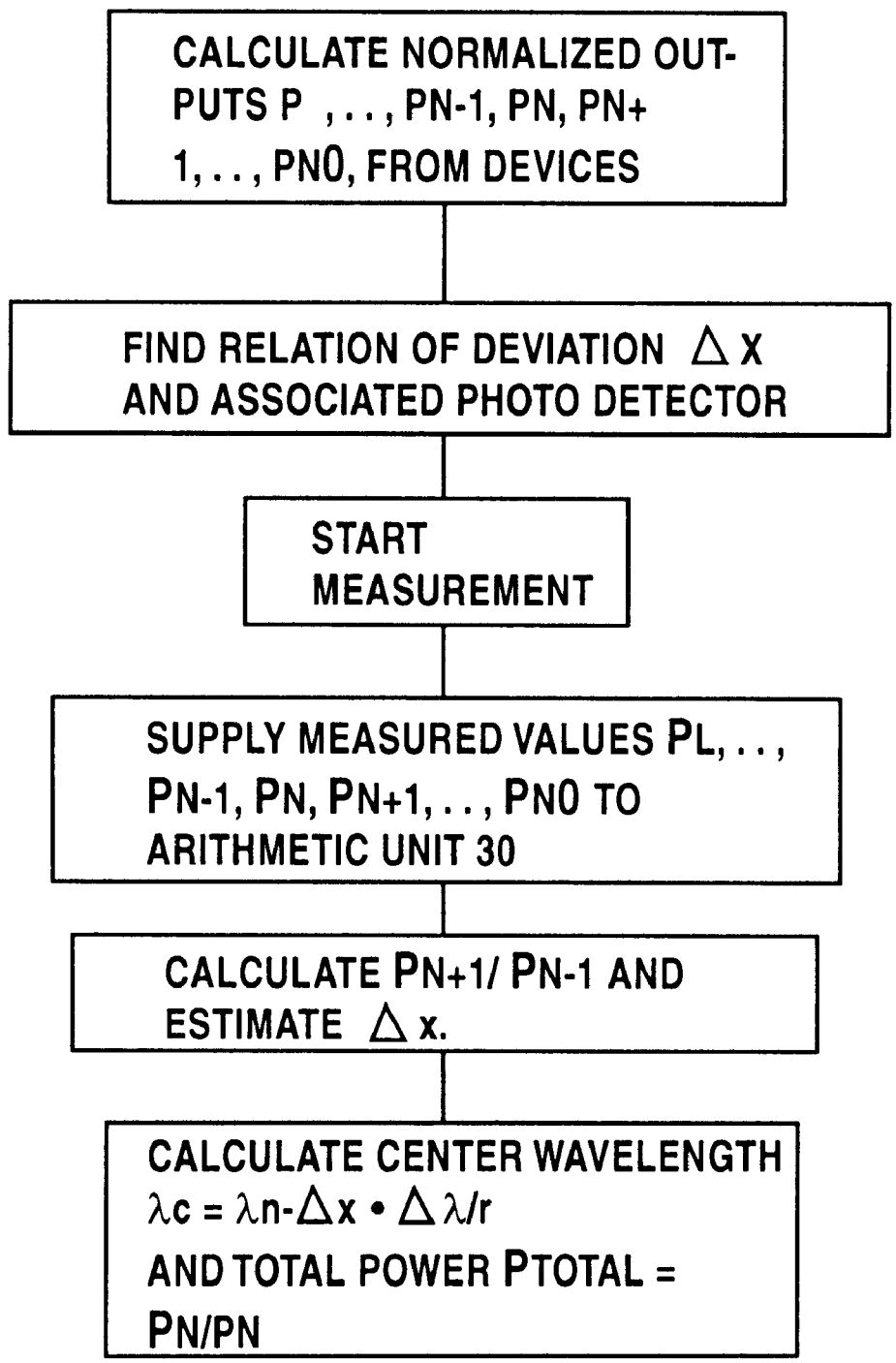
FIG. 3 is a flowchart illustrating the operation.

Under the above-described conditions, the center wavelength $\lambda_0$ and the total power $P_{total}$ can be found by estimating $\Delta x$, using actually measured values $P_1, \ldots, P_{n-1}, P_n, P_{n+1}, \ldots, P_{n0}$, as illustrated in the flowchart of FIG. 3.

The operation performed when the center wavelength $\lambda_0$ and the total power $P_{total}$ are found is described below.

Where the light intensity distribution $g(\xi, \eta)$ at the incident port is of the Gaussian type in the same way as in the case of incidence on a single-mode fiber, if the total power is assumed to be 1, then we have $$g(\xi, \eta) = (2/\pi\omega_0^2) \exp\{-2(\xi^2+\eta^2)/\omega_0^2\} \quad (1)$$

where $\omega_0$ is a spot size.

If the beam is converted or slightly diffracted by lenses, the light intensity distribution f(x, y) on the device array remains the Gaussian type. If no loss occurs, then we have $$f(x, y) = (2/\lambda\omega^2) \exp\{-2(x^2+y^2)/\omega^2\} \quad (2)$$

where $\omega$ is a spot size.

Accordingly, the light power impinging on the k-th device is given by $$P_k = \int_{-1/2}^{1/2} \int_{x_1}^{x_2} \frac{2}{\pi\omega^2} \exp - \frac{2(x^2+y^2)}{\omega^2} dx\, dy$$

where $$x_1 = (k-n)r - d/2 + \Delta x$$

$$x_2 = (k-n)r + d/2 + \Delta x.$$

If it is assumed that $L/2 \gg \omega$, and if the integral range (y-axis) can be replaced as follows $$\int_{-1/2}^{1/2} \to \int_{-\infty}^{\infty}$$

Then, we have $$\int_{-\infty}^{\infty} \exp\left(-\frac{2}{\omega^2} y^2\right) dy = \sqrt{\frac{\pi}{2}} \omega$$

Therefore, $$P_K = \sqrt{\frac{2}{\pi}} \frac{1}{\omega} \int_{x_1}^{x_2} \exp\left(-\frac{2}{\omega^2} x^2\right) dx$$

Then, if a variable conversion given by $(2)^{1/2} \times x/\omega = t$ is done, then we have $$P_K = \frac{1}{\sqrt{\pi}} \int_{t_1}^{t_2} e^{-t^2} dt$$

where $t_1 = (2)^{1/2}(1/\omega)\{(k-n)r - d/2 + \Delta x\}$ $t_2 = (2)^{1/2}(1/\omega)\{(k-n)r + d/2 + \Delta x\}$.

It is easy to apply numerical integration to the above integration. If a complementary error function given by $$E_r f_c(x) = \frac{2}{\sqrt{\pi}} \int_x^{\infty} e^{-t^2} dx$$

is used, we have $$p_k = (1/2)\{E_r f_c(t_2) - E_r f_c(t_1)\}.$$

The relations of the theoretical values $p_{n-1}, p_n, p_{n+1}$, etc. found as described above to $\Delta x$ are next described.

Figure 4A:
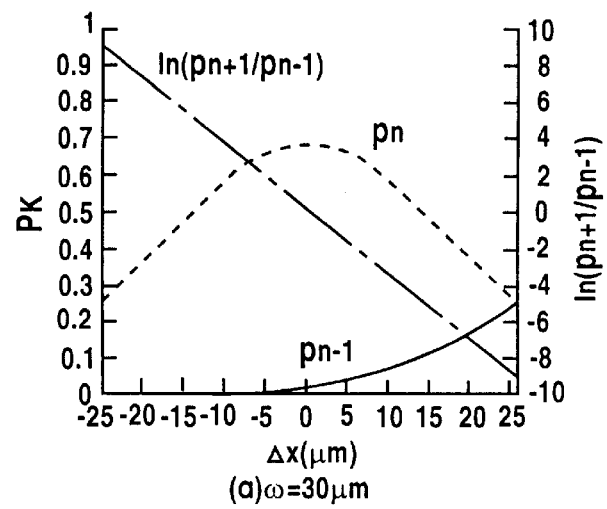
FIG. 4 is a diagram illustrating the relations of $p_{n-1}$, $p_n$, $p_{n+1}$ to $\Delta x$.
Figure 4B:
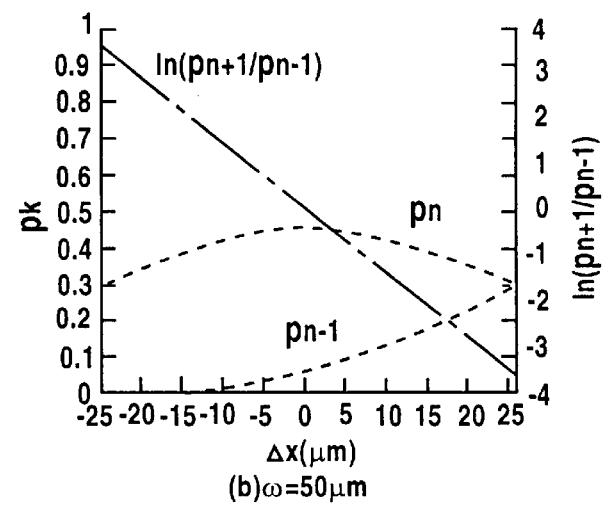
Figure 4C:
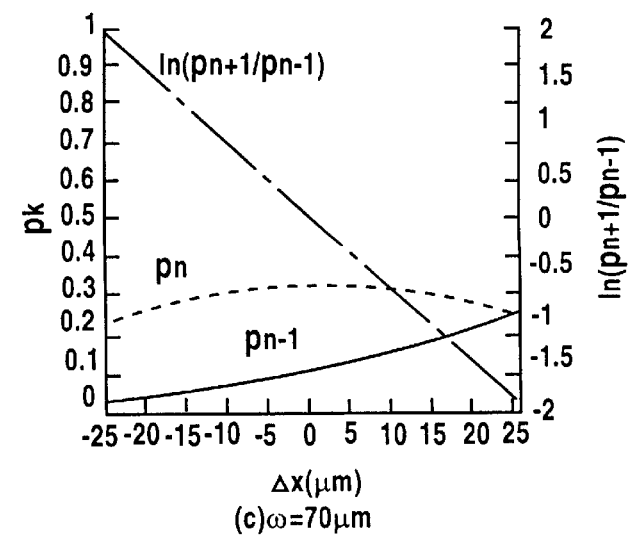

FIG. 4 shows diagrams illustrating the relations of $p_{n-1}, p_n, \ln(p_{n+1}/p_{n-1})$ to $\Delta x$, it being noted that $p_{n+1}$ is obtained by horizontally inverting $p_{n-1}$.

In the above example, it is assumed that d=30 $\mu$m. FIG. 4 shows cases in which r=50 $\mu$m and $\omega$=30, 50, and 70, respectively. That is, logarithmic values of $p_{n+1}/p_{n-1}$, i.e., $\ln(p_{n+1}/p_{n-1})$ have a substantially linear relation to $\Delta x$. Thus, $$\ln(p_{n+1}/p_{n-1}) \Delta x.$$

Therefore, if actually measured values $P_{n-1}, P_n, P_{n+1}$ are obtained, $\Delta x$ can be easily found. The center wavelength $\lambda_0$ and the total power $P_{total}$ are found by the following equations:

$$\lambda_0 = \lambda_n - \Delta x \cdot \Delta\lambda / r$$

$$P_{total} = P_n / p_n.$$

In the above-described method, the relation of $\ln(p_{n+1}/p_{n-1})$ to $\Delta x$ is found in advance. The values of $\ln(p_{n+1}/p_{n-1})$ are found, using actually measured values of $P_{n+1}$ and $P_{n-1}$. Then, $\Delta x$ is found from the obtained values. The present invention is not limited to this scheme. The following method can also be adopted.

We first take notice of the linearity between $\ln(p_{n+1}/p_{n-1})$ and $\Delta x$. This relation is approximated by a straight line passing through three points $(-r/2, \ln(p_{n+1}/p_{n-1}))$, $(0, 0)$, and ($r/2$, $\ln(p_{n+1}/p_{n-1})$). Calculations performed in advance are only for $\ln(p_{n+1}/p_{n-1})$ where $\Delta x = r/2$ or $-r/2$.

Figure 5A:
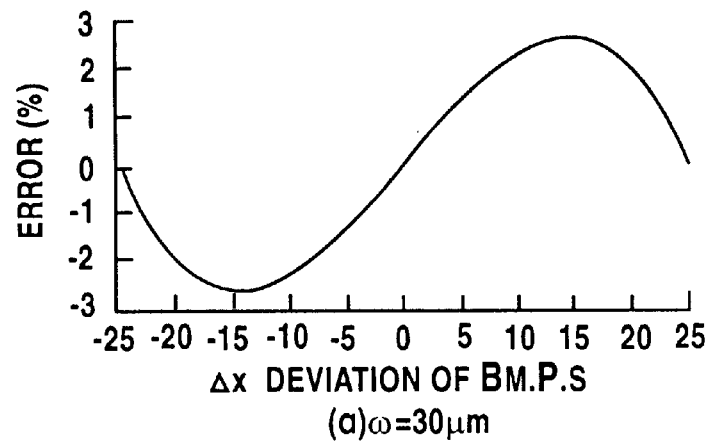
FIG. 5 is a diagram illustrating deviations of $1 n(p_{n+1}/p_{n-1})$ from straight lines.
Figure 5B:
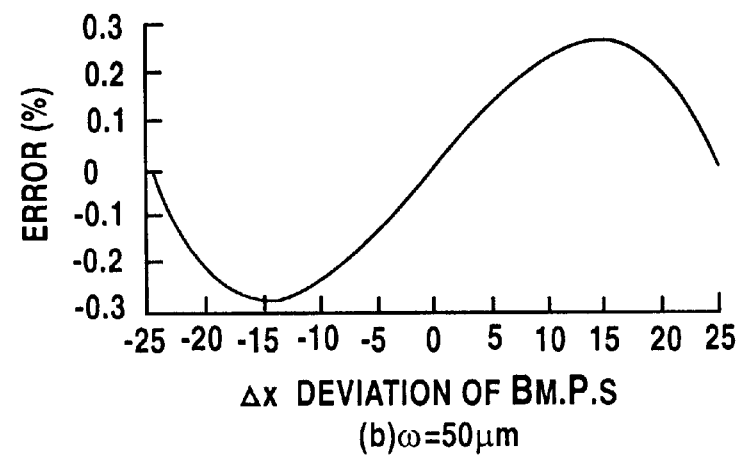
Figure 5C:
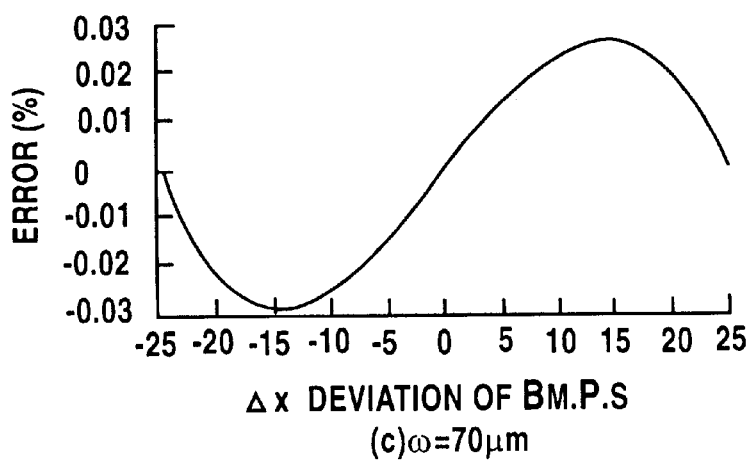

At this time, deviations of strictly obtained $\ln(p_{n+1}/p_{n-1})$ from the above-described straight line are shown in FIG. 5, where $r = 50$ μm and $d = 30$ μm.

In this case, as ω decreases, the error is increased. However, where ω = 30 μm, the error is limited to ±3%. Specifically, where the center wavelength is found by interpolation by the above-described method, it is assumed that $$\lambda_0 = \lambda_n - \Delta x \cdot \Delta \lambda / r.$$

It is also assumed that $$\lambda_n = 1550.0 \text{ nm}$$

$$\Delta \lambda = 0.10 \text{ nm}.$$

If $\Delta x$ contains error of ±3%, $\lambda_0$ can be determined up to the order giving 0.01 nm. In actual optical systems, ω differs slightly among used single-mode fibers. However, ω remains fixed during measurement. Therefore, what must be known in advance is only the inclination of one straight line used for approximation.

What should be taken into consideration is only the ln ($p_{n+1}/p_{n-1}$) when the absolute value of deviation $|\Delta x|$ assumes its maximum value, i.e., $\Delta x \pm r/2$.

Figure 6:
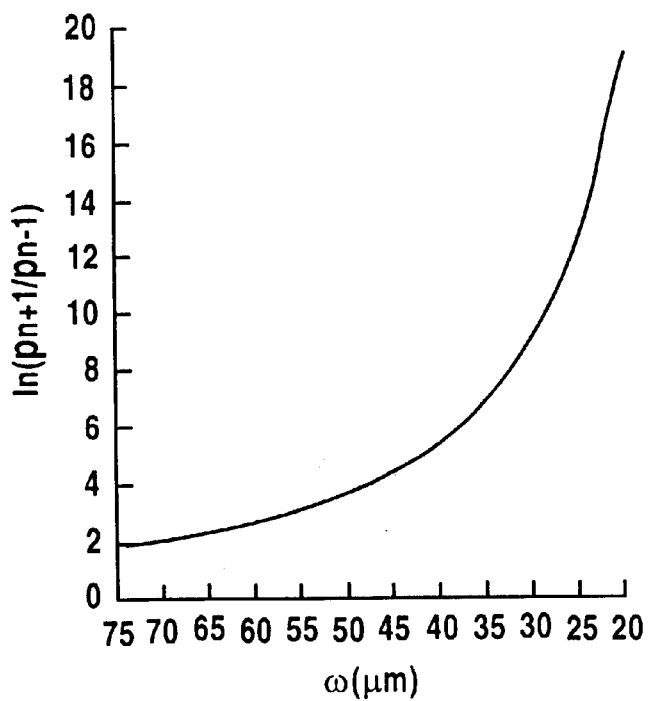
FIG. 6 is a diagram illustrating the relation between $1n(p_{n+1}/p_{n-1})$ and $\omega$.

FIG. 6 shows the relation between $\ln(p_{n+1}/p_{n-1})$ and ω, assuming that $r = 50$ μm, $d = 30$ μm and that $\Delta x = -r/2 = -25$ μm.

In practical applications, a numerical integration may be used more conveniently than complementary error function $E_r f_c(x)$ when theoretical values of $p_{n-1}, p_n, p_{n+1}$ are found. Also, sufficient accuracy is obtained even if increments are not made very small.

Figure 7:
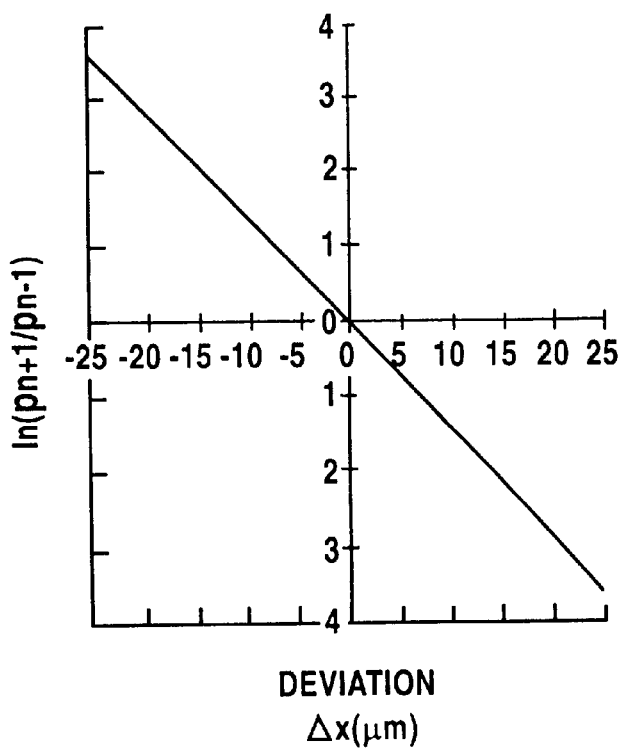
FIG. 7 is a diagram illustrating the relation between $1n(p_{n+1}/p_{n-1})$ and $\Delta x$.

FIG. 7 compares $E_r f_c(x)$ with $\ln(p_{n+1}/p_{n-1})$ found by Simpson's 1/3 rule (m=1) under the condition ω=50 μm, $r = 50$ μm, $d = 30$ μm. On the other hand, the total power can be found from $P_n/p_n$. The error of $p_n$ found by the Simpson's 1/3 rule under the above conditions is about 0.25%, which presents no practical problems.

The following values are actually obtained by measurements and have been normalized with $P_n$:

$$\vdots$$

$$P_{n-1} = 0.489$$

$$P_n = 1 \quad (\lambda_n = 1554.6 \text{ nm})$$

$$P_{n+1} = 0.130$$

$$\vdots$$

Figure 8:
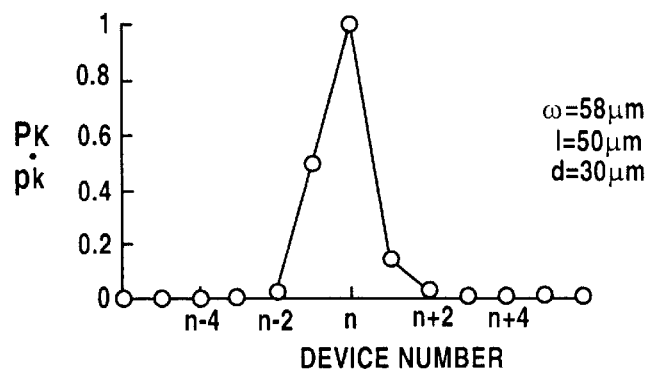
FIG. 8 is a diagram comparing actually measured values $P_k$ and theoretical values $p_k$.

FIG. 8 compares these values with theoretical values $p_{n-1}$, $p_n$, $p_{n+1}$ found by the algorithm of the arithmetic unit 30 under the condition $\Delta x = 12.12$ μm. In practice, values normalized with $p_n = 0.365$ are plotted.

At this time, $$\lambda_0 = 1554.6 - (12.12/50) \times 0.1 = 1554.576 \text{ (nm)}.$$

Since the total power $P_{total}$ has been previously measured and found to be 11.6 nW, the scale of the vertical axis on which values obtained by actual measurements are plotted may be so set that values of $P_n$ are given by $$P_n/p_n = 11.6 \text{ nW}$$

that is, $$P_n = 11.6 \text{ nW} \times 0.365 = 4.23 \text{ nW}.$$

As described thus far, the present invention yields the following advantages. When monochromatic light (laser light) is measured with an optical spectrum analyzer, it is required that the center wavelength and the power level have high accuracies. Where the output from a device array is used as it is, the accuracy of the center wavelength cannot be set higher than the wavelength difference $\Delta \lambda$ between devices of the array. Furthermore, some kind of calculation is indispensable for the total power. However, in the present invention, the accuracies of the center wavelength $\lambda_0$ and the total power $P_{total}$ can be easily enhanced by accurately finding the position of the beam on the device array.

It is expected that a wavelength division multiplexing communication system is used as a large-capacity transmission system. Signals transmitted by the system are carried by carriers, or laser light, and optical fiber amplifiers. The transmitted signals suffer from ASE (amplified spontaneous emission) noise. In this system, of course, the spectrum of the laser light must be measured accurately. In addition, it is important to evaluate the ASE noise which materially affects the S/N of the transmitted signal.

A spectrometer apparatus using a device array has no moving part and so it is optimally used as a transmission signal monitor for a wavelength division multiplexing communication system. However, the dynamic range is insufficient to detect ASE noise near the laser light.

Figure 9:
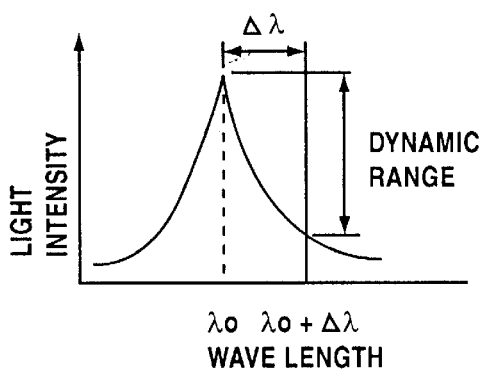
FIG. 9 is a graph illustrating dynamic range.

Generally, the dynamic range of a spectrometer apparatus using a diffraction grating as a dispersing device is determined by the slope of the interference curve. More specifically, it is assumed that monochromatic light (laser light having wavelength $\lambda_0$) enters. The dynamic range is defined as the difference in level between the wavelength $\lambda_0$ and a wavelength deviating from that wavelength by offset $\Delta \lambda$, as shown in FIG. 9. Accordingly, feeble light close to the laser light is buried in the slope of the laser light.

For this reason, it is necessary to improve the dynamic range. The conventional method of improving the dynamic range of a spectrometer apparatus such as an optical spectrum analyzer is to array two or more monochromators in series. In this method, the dispersing devices (prisms or diffraction gratings) are made to follow so that the intrinsic light spectrum is separated from superimposed stray light. This is a so-called double monochromator system.

However, it is difficult to employ the above-described method in a spectrometer apparatus combining a device array and fixed dispersing device because of the mechanical problems. Accordingly, there is an earnest demand for other method.

Figure 10:
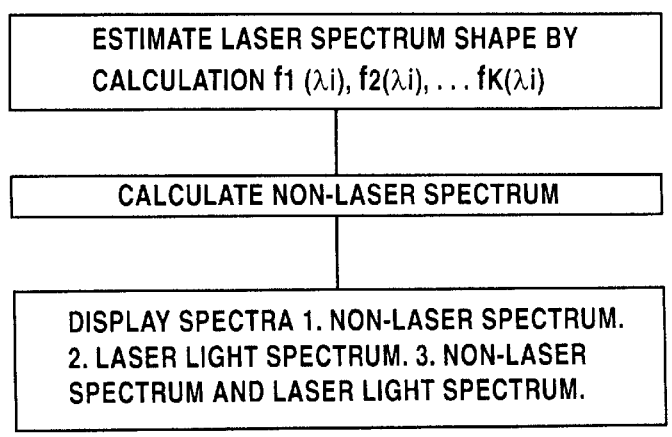
FIG. 10 is a flowchart illustrating additional functions of an arithmetic unit.

Another embodiment of the invention which solves this problem is next described. This is an optical spectrum analyzer which is similar to the optical spectrum analyzer shown in FIG. 1 except that functions represented by the flowchart of FIG. 10 are added to the arithmetic unit 30 and that the following functions are added to the display unit 40.

The optical spectrum analyzer constructed in this way makes use of the fact that the shape of the spectrum obtained when laser light is measured can be estimated from the center wavelength and from the power. The instrument can measure ASE noise buried in laser light, and can equivalently enhance the dynamic range.

The operation is next described. The arithmetic unit arithmetically estimates the shape of the spectrum from the center wavelength and from the power of the laser light which are found as described above. It is assumed that the spectrum is composed of K wavelengths $f_1(\lambda.i), f_2(\lambda.i), \ldots, f_K(\lambda.i)$. Then, the following formula is calculated:

$$M(\lambda_i) - \sum_{K} f_K(\lambda_i)$$

where $M(\lambda_i)$ are data obtained by actual measurements. By this calculation, the spectrum of non-laser light spectrum, i.e., the spectrum of ASE noise, is found.

The display unit 40 has a function of displaying one or both of the light spectrum and the non-laser light spectrum found as described above on demand.

In the above embodiment, the light intensity distribution $g(\xi, \eta)$ at the incident part is of the Gaussian type. The invention is not limited to this type. It may also be of the Lorentz type.

Other example of spectrometer apparatus' is next described. In the above example of the spectrometer apparatus, the wavelength resolution and the range of measured wavelengths are determined by the number of devices of the device array, the pitch, the focal distance of the focusing mirror, and other factor. Trade-offs are made between the wavelength resolution and the range of the measured wavelengths. Therefore, if one is improved, then the other is deteriorated. It is impossible to improve both at the same time. A spectrometer apparatus as shown in FIG. 11 solves this problem, and is provided with a plurality of incident ports, or slits. The instrument can extend the range of measured wavelengths while maintaining desired wavelength resolution.

FIG. 11 shows the spectrometer apparatus equipped with a plurality of incident ports. In this example, only two incident ports are shown, for simplicity. It is to be noted that like components are indicated by like numerals in both FIGS. 1 and 11. Indicated by 16 and 17 are incident ports whose widths are adjusted by slits. Light having a wavelength range of $\lambda_{10} \pm \Delta\lambda$ enters from the incident port 16. Light having a wavelength range of $A_{20} \pm \Delta\lambda$ enters from the incident port 17.

This spectrometer apparatus comprises one device array 15 which covers both wavelength ranges $\lambda_{10} \pm \Delta\lambda$ and $\lambda_{20} \pm \Delta\lambda$. The incident angles $\alpha_{10}$ and $\alpha_{20}$ of the two wavelengths to a diffraction grating 13 are so set that their diffraction angles for the center wavelengths $\lambda_{10}$ and $\lambda_{20}$ of the two wavelength ranges, respectively, are equal to $\beta_0$.

In the case of a light-dispersing instrument using a device array, the wavelength resolution is limited by some factors. It is now assumed that its theoretical resolution is limited by the number ($n_{ch}$) of the devices of the array and also by the range ($2\Delta\lambda$) of measured wavelengths. That is, if the theoretical resolution is defined as the difference between the difference in wavelength between adjacent devices, then the following equation holds:

theoretical resolution=$2\Delta\lambda/(n_{ch}-1) \approx 2\Delta\lambda/n_{ch}$ where $n_{ch} \gg 1$.

In the configuration shown in FIG. 11, the range of measured wavelengths can be extended by a factor of two while maintaining the theoretical resolution. Even if the resolution is restricted by other factors, the range of measured wavelengths can be extended by a factor corresponding to the number of incident ports while maintaining the resolution.

The operation of the optical system shown in FIG. 11 is described in further detail. The fundamental equation for a diffraction grating is given by $\sin(\alpha)+\sin(\beta)=m\lambda/d$ where $\alpha$ is the incident angle, $\beta$ is the diffraction angle, m is the order of diffraction, $\lambda$ is a wavelength, and d is a grating constant. From this fundamental equation, the diffraction angles $\beta_{10}$ and $\beta_{20}$ for the center wavelengths $\lambda_{10}$ and $\lambda_{20}$ of the two wavelength ranges are given by $\beta_{10}=\sin^{-1}(m\lambda_{10}/d-\sin(\alpha_{10}))$ $\beta_{20}=\sin^{-1}(m\lambda_{20}/d-\sin(\alpha_{20}))$.

If the incident ports are so set up that the incident angles $\beta_{10}$ $\beta_{20}$ satisfy the condition $\beta_{10}=\beta_{20}$, i.e., $m\lambda_{10}/d-\sin(\alpha_{10})=m\lambda_{20}/d-\sin(\alpha_{20})$ then the following equation always holds for the deviation $\Delta\lambda$ from their respective center wavelengths:

$m\{\lambda_{10}\pm\Delta\lambda)/d\}-\sin(\alpha_{10})=m\{\lambda_{20}\pm\Delta\lambda)/d\}-\sin(\alpha_{20})$.

That is, if the two wavelength ranges, incident ports, incident angles, and center wavelengths are set as described above, the same device array can cover both wavelength ranges.

If more than two wavelengths exist, the same theory applies as long as the incident ports, incident angles, and center wavelengths are established as described above. The range of measured wavelengths can be extended while maintaining the desired resolution.

FIG. 12 shows a further embodiment of the present invention. Optical fiber connectors (receptacles) 18 and 19 are mounted at incident ports. One incident port is selected according to the measured wavelength, and optical fiber 1 is replaced.

Since the positions at which the optical fiber connectors 18 and 19 are mounted are fixed, the position of the incident light is not affected by replacement of the fiber.

Figure 13:
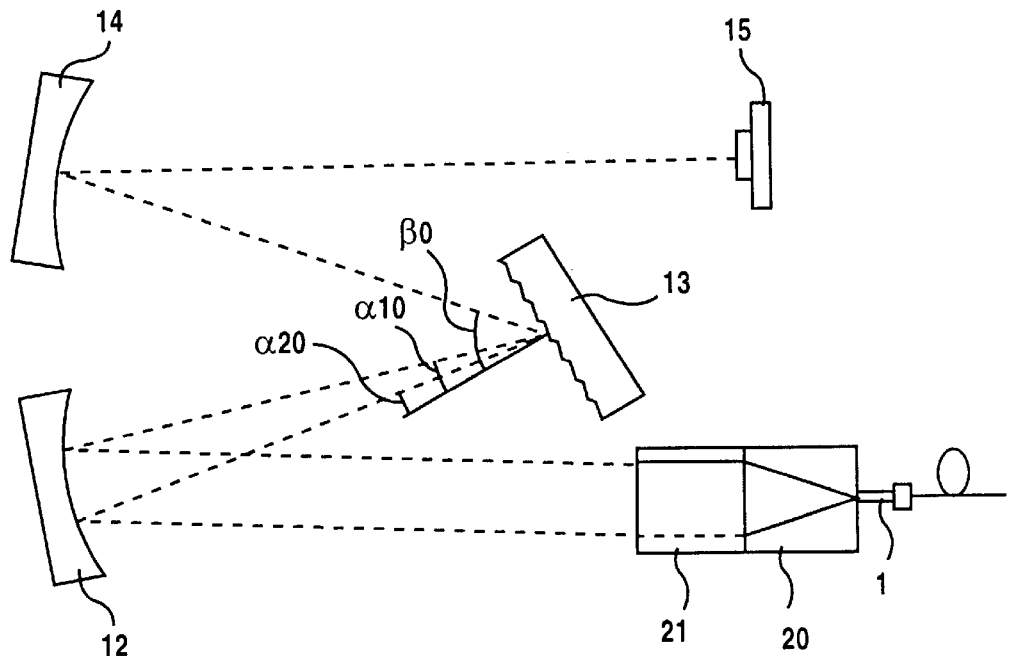

FIG. 13 shows a still other embodiment of the invention. A light-splitting means 20 is combined with an optical channel selector 21. The optical channel selector 21 is driven to pass only one of output light rays from the light-splitting means 20. An incident port is selected without replacing the optical fiber 1.

Figure 14:
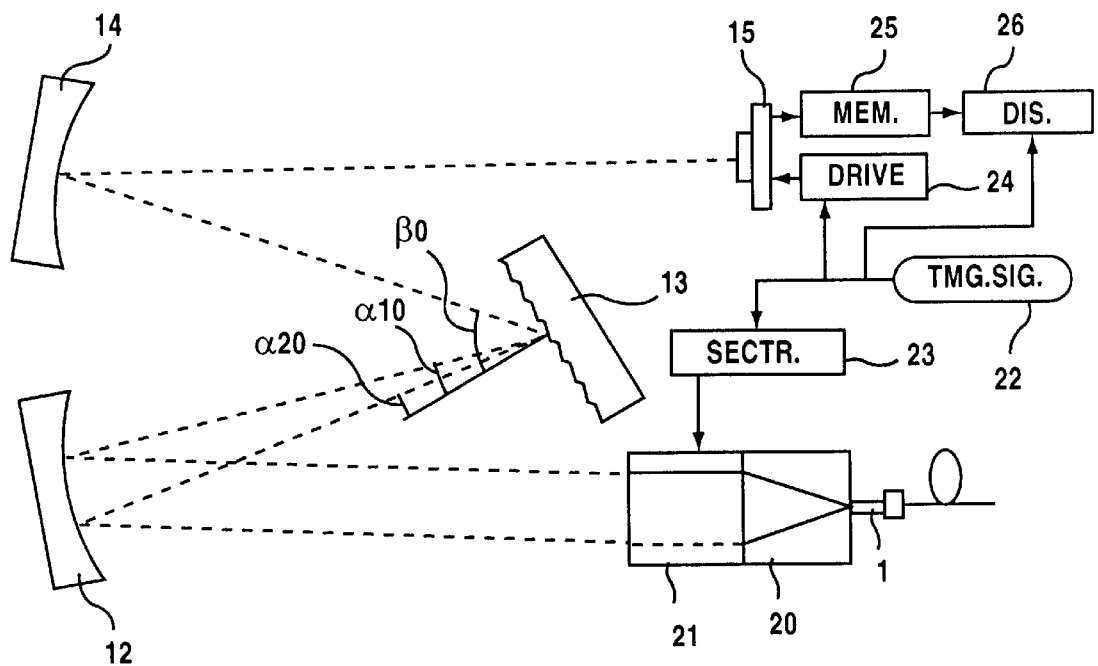

FIG. 14 shows a yet other embodiment of the invention. A timing signal generator 22 produces a timing signal. A driver circuit 24 acts to read the output from a device array 15. A switching control circuit 23 serves to switch the channel of an optical channel selector 21. The timing signal is supplied to the driver circuit 24 and to the switching control circuit 23 to synchronize the reading of the output from the device array 15 with the timing at which the channel of the optical channel selector 21 is switched. That is, the device array is swept in synchronism with the switching of the channel. Signals produced from plural channels during one period are alternately accepted. Thus, plural wavelength ranges are measured simultaneously, though a time difference corresponding to the sweep time exists.

Output signals from the devices of the array are stored in a memory 25. Signals from different wavelength ranges are arranged in the memory 25 in the order of passage of time. Signals from the desired wavelength range are read out in synchronism with the aforementioned timing signal and displayed on a display unit 26.

Figure 15:
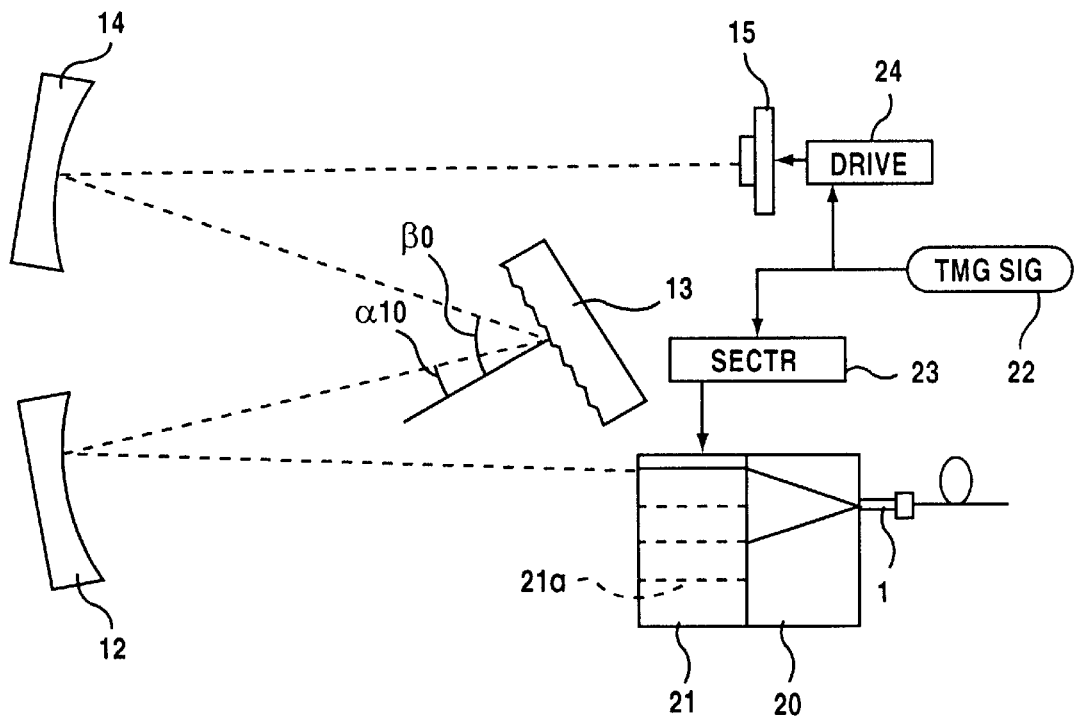

FIG. 15 shows an additional embodiment of the invention. In the configuration of FIG. 15, an optical channel selector 21 is equipped with a channel 21a on which no incident light impinges. Dark output is accepted on a real-time basis. The dark output can be canceled or corrected for measured values from a device array.

Figure 16:
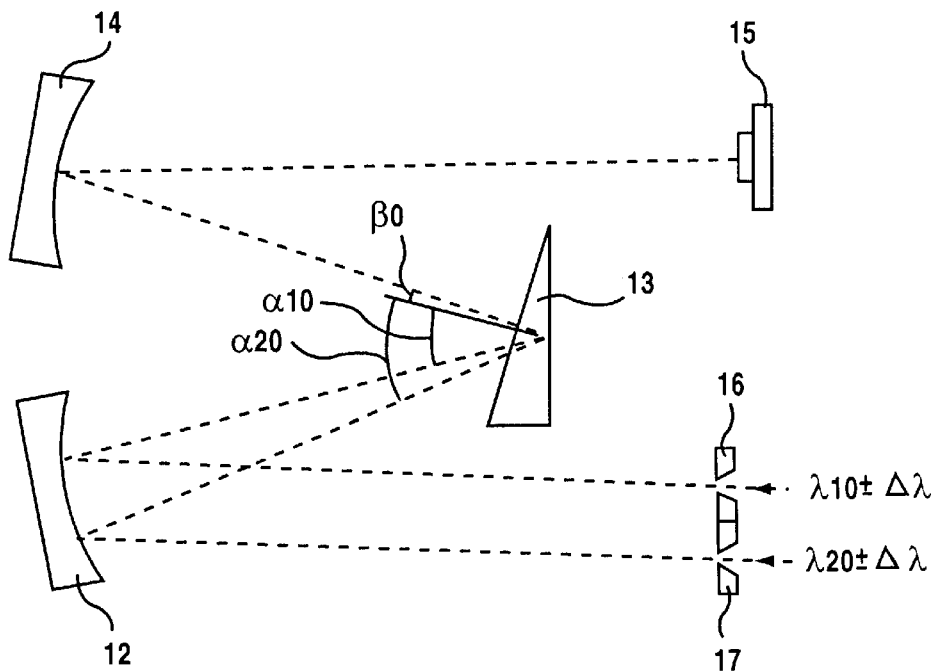

FIG. 16 shows a configuration in which a prism is used as a dispersing device 13. If incident ports are provided, taking account of the angular dispersion of the prism, then the foregoing theory applies.

It is to be understood that the description of the present invention provided thus far shows only certain preferred embodiments for illustrative purposes only. Accordingly, it is obvious that many modifications and changes are possible without departing from the spirit of the invention.

I claim:

1. An optical spectrum analyzer comprising:

a spectrometer comprising an incident port means for receiving light to be measured, a dispersing means for receiving from said incident port means light to be measured, a plurality of photo detectors comprising first, second and third photo detectors, and focusing means for focusing light from said dispersing means onto said plurality of photo detectors so that the plurality of photo detectors generate measured output power of the light to be measured;

an arithmetic means for calculating a center wavelength and total power of the light to be measured based on output signals generated by said plurality of photo detectors and representing light power distribution at said incident port means as detected by said plurality of photo detectors; and display means for displaying value of said center wavelength and said total power, wherein said arithmetic means comprises:

means for finding in advance logarithmic value of output power of light detected by said first photo detector divided by output power of light detected by said second photo detector, said first and second photo detectors being located on opposite sides of said third photo detector, said third photo detector producing maximum output power; and means for taking output power resulting from light to be measured as detected by said first and second photo detectors and using the measured output powers and said found logarithmic values of the output powers obtaining a calculated center wavelength of the light to be measured and total power of the light to be measured.

2. An optical spectrum analyzer comprising:

a spectrometer comprising an incident port means for receiving light to be measured, a dispersing means for receiving from said incident port means light to be measured, a plurality of photo detectors comprising first, second and third photo detectors, and focusing means for focusing light from said dispersing means onto said plurality of photo detectors so that the plurality of photo detectors generate measured output power of the light to be measured;

an arithmetic means for calculating a center wavelength and total power of the light to be measured based on output signals generated by said plurality of photo detectors and representing light distribution at said incident port means as detected by said plurality of photo detectors; and display means for dispaying value of said center wavelength and said total power; wherein said arithmetic means comprises:

means for finding in advance logarithmic value of output power of light detected by said first photo detector divided by output power of light detected by said second photo detector, said first and second photo detectors being located on opposite sides of said third photo detector, said third photo detector producing maximum output power;

means for taking output power resulting from the light to be measured as detected by said first and second photo detectors and using the measured output powers and said found logarithmic values of the output powers obtaining a calculated center wavelength of the light to be measured and total power of the light to be measured;

means for calculating a first spectrum of the light to be measured from said calculated center wavelength and total power; and means for calculating a second spectrum of light other than the light to be measured of said first spectrum and from output data from said plurality of photo detectors.

3. The spectrometer of claim 1 or 2, wherein said dispersing means comprises a diffraction grating or prism.

4. The spectrometer of claim 1 or 2, wherein said incident port means comprises a plurality of optical fibers connected to an incident port, said plurality of optical fibers applying a range of measured wavelengths of light to said incident port.

5. The spectrometer of claim 1 or 2, wherein said incident port means comprises a plurality of incident ports, a light splitting means, and an optical channel selector, said light splitting means concurrently applying light to be measured into said plurality of incident ports, and said optical selector selecting a desired one of a plurality of sets of wavelengths.

6. The spectrometer of claim 5, wherein said optical channel selector comprising means for scanning in synchronism with reading out of said plurality of photodetectors, and wherein the plurality of sets of wavelengths are used for measurement.

7. The spectrometer of claim 6, wherein said optical channel selector comprises an insensitive channel means for not receiving measured light, and means for measuring dark output from said insensitive channel means to correct values obtained from other channels by measurement.

8. The analyzer of claim 1, wherein said incident port means comprises a single mode optical fiber and an incident port connected to said optical fiber, and wherein light power distribution at said incident port is in the form of a Gaussain distribution or a Lorentz distribution.

9. The analyzer of claim 2, wherein said incident port means comprises a single mode optical fiber and an incident port connected to said optical fiber, and wherein light power distribution at said incident port is in the form of a Gaussian distribution or Lorentz distribution.

* * * * *